United States Patent [19]

Iwata et al.

[11] Patent Number: 4,589,768
[45] Date of Patent: May 20, 1986

[54] ORIGINAL TRANSFER APPARATUS

[75] Inventors: Yasuhiro Iwata; Toshiyuki Watanabe, both of Yokohama; Seiichi Kobayashi, Mitaka, all of Japan

[73] Assignee: Kabushiki Kaisha Toshiba, Kawasaki, Japan

[21] Appl. No.: 667,445

[22] Filed: Nov. 1, 1984

[30] Foreign Application Priority Data

Jan. 9, 1984 [JP] Japan ................................. 59-1659

[51] Int. Cl.⁴ ...................... G03B 27/48; G03B 27/50
[52] U.S. Cl. .................................. 355/50; 355/3 SH; 355/75
[58] Field of Search ................. 355/3 SH, 14 SH, 50, 355/75; 271/245

[56] References Cited

U.S. PATENT DOCUMENTS 3,844,552 10/1974 Bleau et al. ....................... 271/245
4,322,160 3/1982 Kobus ................................ 355/75
4,420,149 12/1983 Schultes et al. ............. 355/3 SH X
4,428,667 1/1984 Phelps et al. ..................... 355/3 SH Primary Examiner—Richard A. Wintercorn
Attorney, Agent, or Firm—Cushman, Darby & Cushman

[57] ABSTRACT

An original transfer apparatus used in an image-forming apparatus for forming an image in accordance with image information from an original set on an original table, whereby the original is transferred to the original table, is provided with a housing which is removably attached to the image-forming apparatus. The housing contains therein a transfer mechanism for swallowing and transferring the original to the original table. A drive source for driving the transfer mechanism is integrally provided in the housing. Since the drive source is contained in the housing, the original transfer apparatus can be mounted on the image-forming apparatus with ease.

10 Claims, 15 Drawing Figures

ORIGINAL TRANSFER APPARATUS

BACKGROUND OF THE INVENTION

The present invention relates to an original transfer apparatus for automatically transferring an original to an original table of an image-forming apparatus.

In general, an image forming apparatus, e.g., a copying apparatus, is mounted with an original transfer apparatus for automatically transferring an original to be copied to an original table of the image-forming apparatus. Conventionally, the original transfer apparatus of this type is provided only with a drive mechanism for swallowing the original and moving it onto the original table. A drive source, e.g., a motor, for the drive mechanism is disposed not in the original transfer apparatus but in the image-forming apparatus. In mounting the prior art original transfer apparatus on the image-forming apparatus, therefore, it is necessary to use a transmission mechanism for transmitting the output of the motor in the image-forming apparatus to the drive mechanism of the original transfer apparatus. The transmission mechanism needs to be connected to the drive mechanism, which requires much time and labor because it is difficult to find the engaging position between the transmission mechanism and the drive mechanism.

SUMMARY OF THE INVENTION

The object of the present invention is to provide an original transfer apparatus simple in construction and capable of being readily attached to an image-forming apparatus.

According to an aspect of the present invention, there is provided an original transfer apparatus used in an image-forming apparatus for forming an image in accordance with image information from an original set on an original table to be imaged, whereby the original is transferred to the original table, the original transfer apparatus comprising a housing removably attached to the image-forming apparatus, a transfer mechanism disposed in the housing and adapted to swallow and transfer the original to the original table of the image-forming apparatus, and a drive source integrally provided in the housing and adapted to drive the transfer mechanism.

DETAILED DESCRIPTION OF THE PREFERRED EMBODIMENT

Referring now to the accompanying drawings of FIGS. 1 to 15, one embodiment of the present invention will be described in detail.

Figure 1:
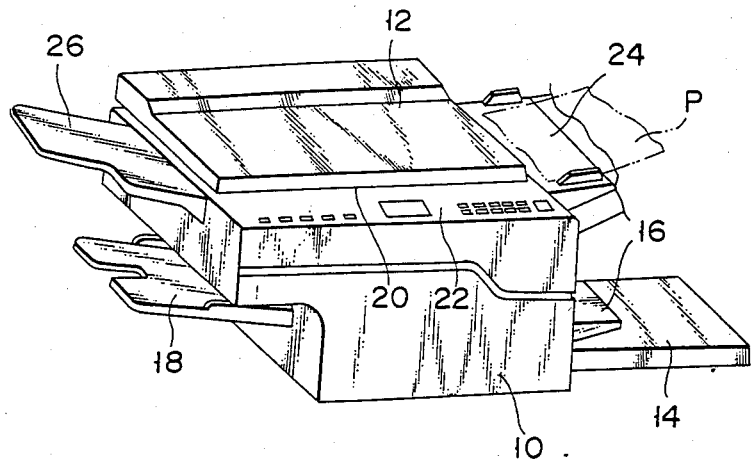
FIG. 1 is a perspective view schematically showing an image-forming apparatus mounted with an original transfer apparatus according to one embodiment of the present invention.

As shown in FIG. 1, an original transfer apparatus 12 according to one embodiment of the invention is mounted on a copying machine (image-forming apparatus) 10 for copying an original P. In the copying machine 10, a sheet cassette 14 and a sheet-bypass guide 16 are provided at the lower right side portion thereof; a copy-receiving tray 18 is provided at the lower left side portion; an original table 20 is provided at the top center; a console panel 22 having a start switch 21 is provided at the top front; an original insertion guide 24 is provided at the upper right side portion; and an original-receiving tray 26 is provided at the upper left side portion.

The original transfer apparatus 12, which is swingably mounted on the original table 20, automatically transfers the original P to a predetermined position (exposure position) on the original table 20 when one end of the original P is inserted between the original table 20 and the original transfer apparatus 12.

Figure 2:
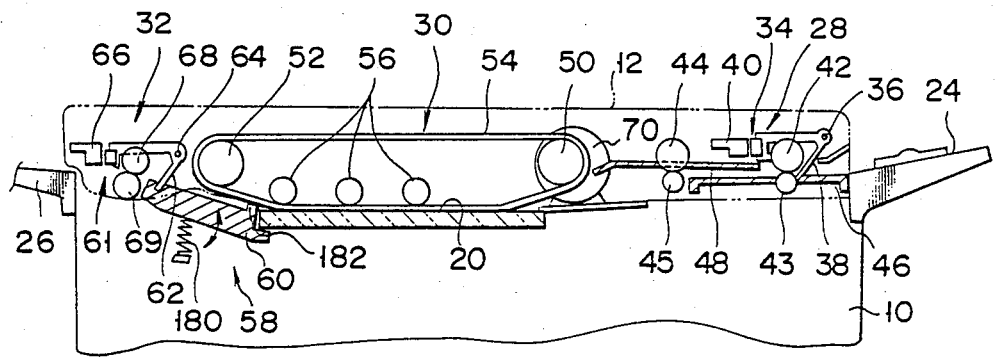
FIG. 2 is a schematic sectional view of the original transfer apparatus shown in FIG. 1.

As shown in FIG. 2, the original transfer apparatus 12 is provided with an inlet unit 28 for detecting the insertion of the original P and swallowing the original P; a transfer unit (drive mechanism) 30 adapted to transfer the swallowed original P to the top of the original table 20 and to discharge the original P after exposure; and an outlet unit 32 for detecting the discharge of the original P from the original transfer apparatus 12.

The inlet unit 28 is provided with a detecting mechanism 34 for detecting the original P inserted along the original insertion guide 24. The detecting mechanism 34 includes an actuator 38 rockably supported by a shaft 36 and a reed switch 40 adapted to be turned on when the actuator 38 is rocked. The inlet unit 28 further includes a pair of feed roller assemblies 42 and 43 which are driven to transfer the original P when the original P is detected, that is, when the reed switch 40 is turned on. A pair of aligning roller assemblies 44 and 45 for aligning the original P is arranged between the transfer unit 30 and the feed roller assemblies 42 and 43.

Guide plates 46 and 48 for guiding the original P are arranged along the feed roller assemblies 42 and 43 and the aligning roller assemblies 44 and 45. The original P passed between the aligning roller assemblies 44 and 45 is fed to the transfer unit 30.

The transfer unit (drive mechanism) 30 is provided with belt rollers 50 and 52 spaced along the course of transfer of the original P. An endless transfer belt 54 is stretched between the belt rollers 50 and 52. Backup rollers 56 are arranged between the belt rollers 50 and 52 so as to press the transfer belt 54 against the original table 20. A stopper 58 is attached to that portion of the top of the copying machine 10 which corresponds to the rear end side (side of the belt roller 52) of the transfer unit 30. The stopper 58 serves to stop the original P transferred to the original table 20 at the exposure position. The stopper 58 has an abutting member 60 which can project above the edge of the original table 20 to engage the forward end of the original P. The original P transferred on the original table 20 is aligned and stopped by the stopper 58 before it is exposed. After exposure, the stopper 58 is disengaged, and the original P is carried toward the outlet unit 32 by the transfer belt 54.

The outlet unit 32 is provided with a discharge detecting mechanism 61 for detecting the discharge of the original P. An actuator 62 is rockably supported on the discharge detecting mechanism 61 by means of a shaft 64. Disposed beside one end of the actuator 62 is a reed switch 66 which is turned on when the actuator 62 is rocked. The outlet unit 32 further includes a pair of exit roller assemblies 68 and 69 which are actuated to discharge the original P into the original receiving tray 26 when the reed switch 60 is turned on.

Figure 3:
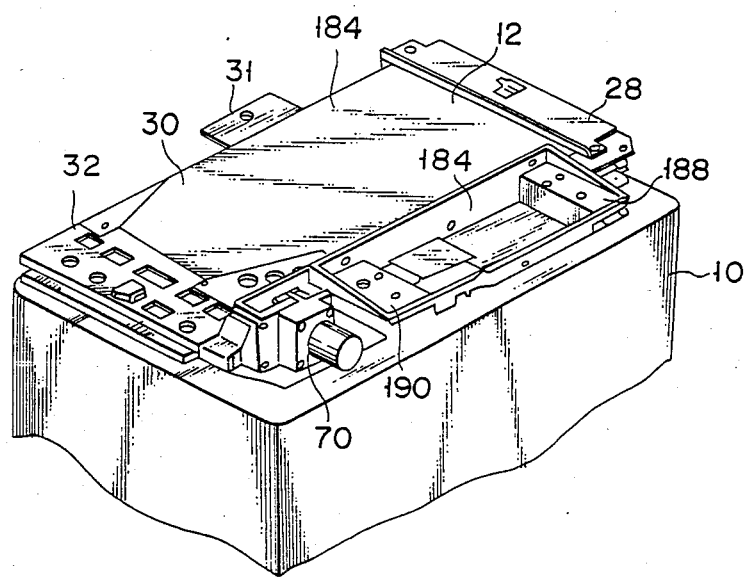
FIG. 3 is a perspective view showing an uncovered original transfer apparatus of FIG. 2.

As shown in FIGS. 2 and 3, the original transfer apparatus 12 is further provided with a reversible motor 70. The motor 70 is coupled to the upper feed roller assembly 42, the upper aligning roller assembly 44, the belt rollers 50 and 52, and the upper exit roller assembly 68 by means of a gear unit 71 (mentioned later). Numeral 31 designates a grip adapted to be grasped in swinging the original transfer apparatus 12 up or down over the original table 20 to open or close the top of the table 20.

Figure 4:
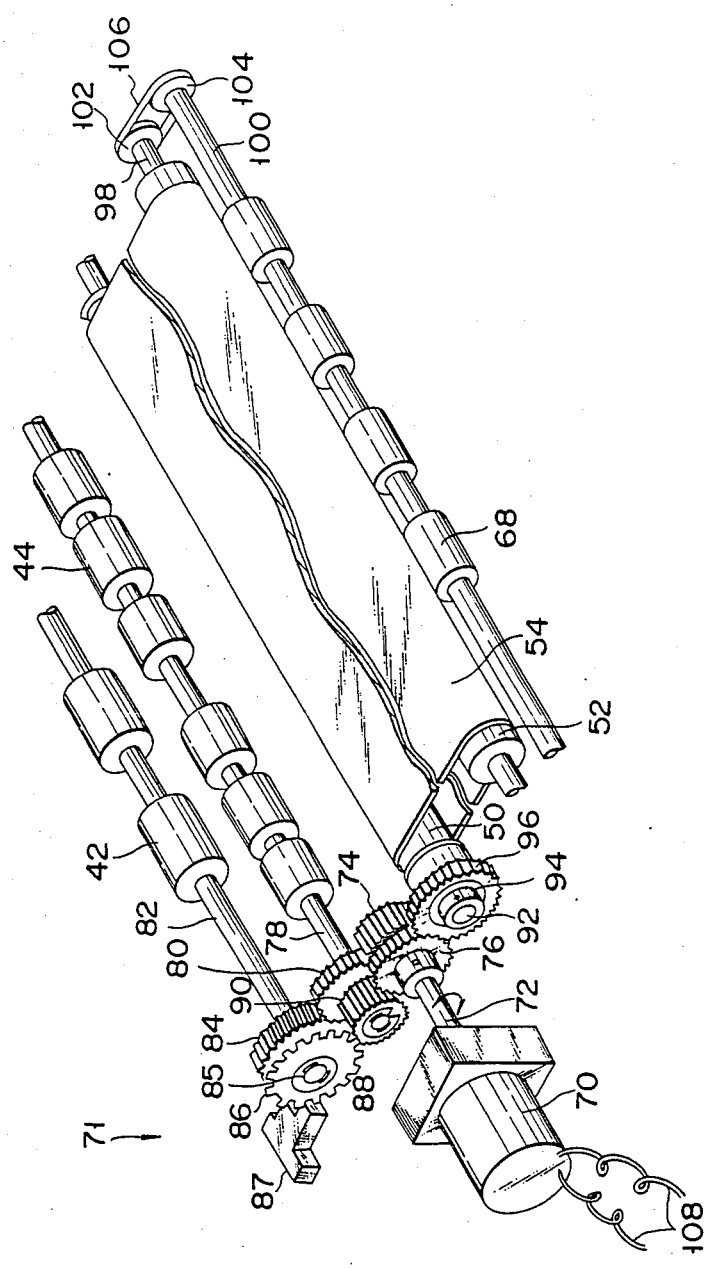
FIG. 4 is a perspective view schematically showing a drive source and a drive mechanism arranged in the original transfer apparatus of FIG. 2.

In the gear unit 71, as shown in FIG. 4, first and second gears 74 and 76 are coaxially fixed on a rotating shaft 72 of the reversible motor 70. The first gear 74 is in mesh with a third gear 80 which is rotatably mounted on a shaft 78 of the upper aligning roller assembly 44. The third gear 80 is in mesh with a fourth gear 84 which is fixed on a shaft 82 of the upper feed roller assembly 42. The fourth gear 84 contains a one-way clutch 85 for transmitting rotation in one direction only. Also, the fourth gear 84 is fitted with a pulse disk 86, whereby the number of revolutions of the motor 70 is detected as a number of pulses by means of a pulse detector 87. Since the pulse disk 86 is not coupled to the one-way clutch 85, it rotates together with the fourth gear 84. The second gear 76 is in mesh with a fifth gear 90 fixed on the shaft 78 of the upper aligning roller assembly 44 and with a sixth gear 96 fixed on a shaft 92 of the supply-side belt roller 50. The fifth gear 90 and sixth gear 96 respectively contain one-way clutches 88 and 94. The one-way clutches 85, 88 and 94 are of a conventional type, each consisting of a metal-ring shell and a roller contained therein. Pulleys 102 and 104 are fixed on a shaft 98 of the discharge-side belt roller 52 and a shaft 100 of the upper exit roller assembly 68, respectively. A transmission belt 106 is stretched between the pulleys 102 and 104. A printed board 110 (FIG. 11) for motor control is connected to the motor 70 by means of cords 108.

The printed board 110 serves to supply its output to the motor 70 in accordance with a logic signal from the copying machine 10.

Figure 5:
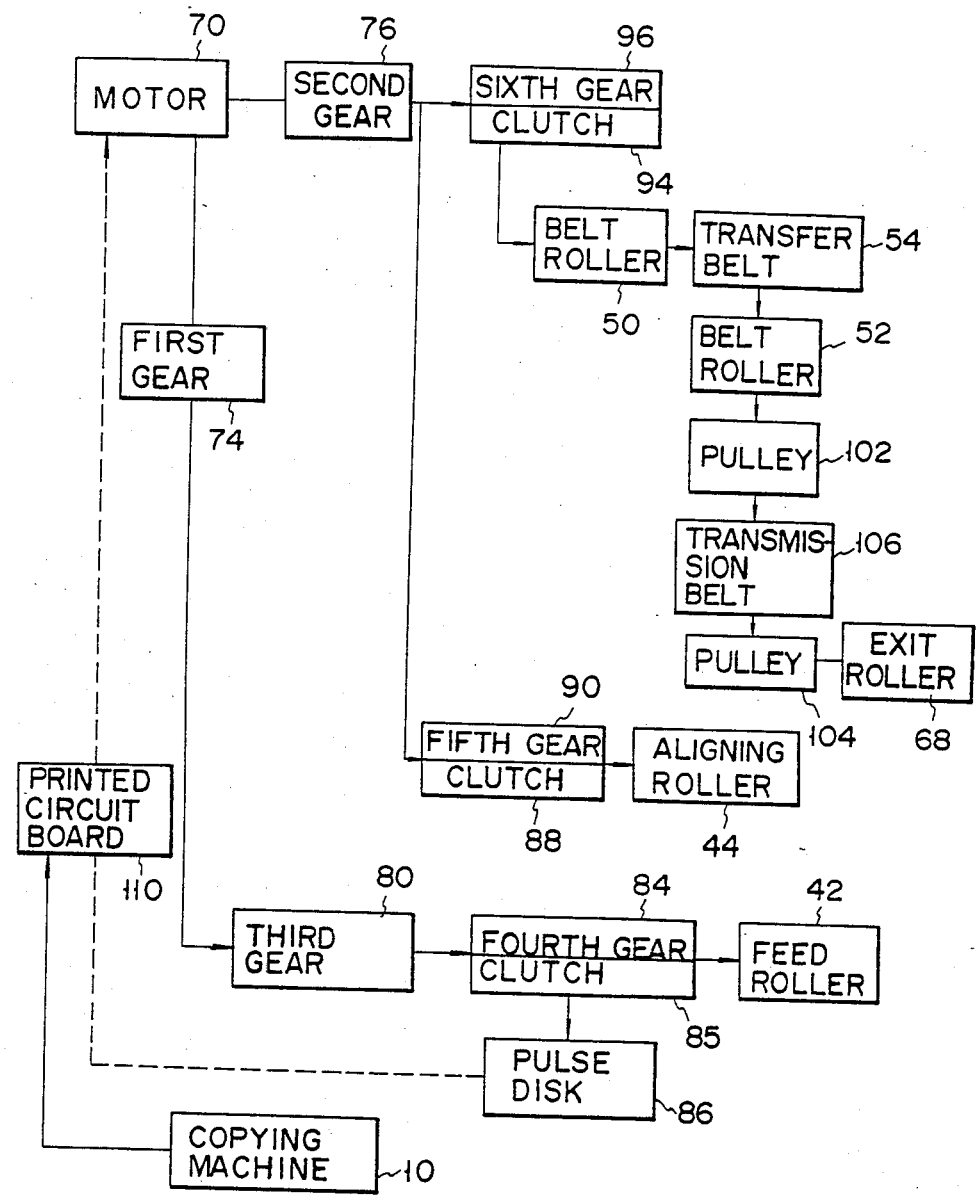
FIG. 5 is a block diagram illustrating the control and operation of the drive mechanism shown in FIG. 4.

According to the gear unit 71 with the abovementioned construction, as shown in FIG. 5, if the shaft 72 of the motor 70 is rotated reversely, the fifth and sixth gears 90 and 96 in mesh with the second gear 76 are rotated freely, while the driving force is prevented from being transmitted to the shafts 78 and 92 by the one-way clutches 88 and 94, respectively. In this case, the rotatory force is transmitted to the third gear 80 which is in mesh with the first gear 74. The rotation of the third gear 80 is then transmitted to the fourth gear 84, so that the upper feed roller assembly 42 and the pulse disk 86 are rotated together by means of the shaft 82. If the shaft 72 of the motor 70 is rotated in the forward direction, the first and third gears 74 and 80 are rotated, while the rotatory force is prevented from being transmitted to the upper feed roller assembly 42 by the one-way clutch 85. However, the pulse disk 86 is rotated together with the fourth gear 84. Meanwhile, if the second gear 76 is rotated as the shaft 72 is rotated forward, the fifth and sixth gears 90 and 96 in mesh with the second gear 76 are rotated. The rotation of the fifth gear 90 is transmitted to the upper feed roller assembly 42 through the one-way clutch 85. The rotation of the sixth gear 96 is transmitted to the right-hand belt roller 50 through the one-way clutch 94. The rotation of the right-hand belt roller 50 is transmitted to the transfer belt 54, and also to the upper exit roller assembly 68 through the left-hand belt roller 52, the pulley 102, the belt 106, and the pulley 104. If the motor 70 is rotated in the reverse direction, the driving force is transmitted to the upper aligning roller assembly 44, the transfer belt 54, and to the upper exit roller assembly 68. The pulse disk 86 rotates when the motor 70 rotates, whether forward or reverse, and its pulses are supplied to the printed board 110 for motor control. The printed board 110 is supplied with electric power and logic signals from the copying machine 10. The output of the printed board 110 is fed to the motor 70.

Figure 6:
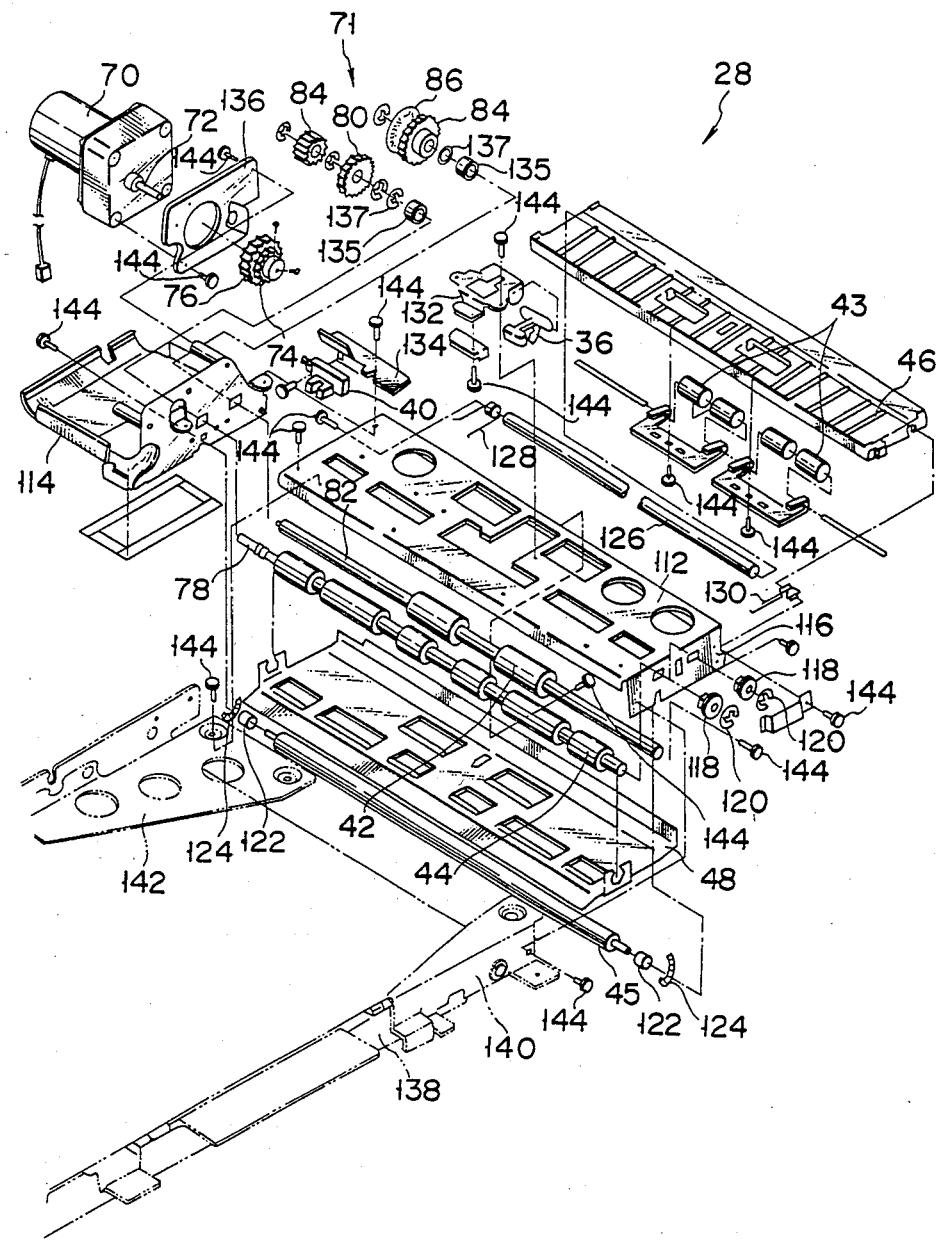
FIG. 6 is a disassembled perspective view showing part of an inlet unit of the original transfer apparatus of FIG. 2.

The construction of the inlet unit 28, the transfer unit 30, and the outlet unit 32 of the original transfer apparatus 12 will now be described in detail. In the inlet unit 28, as shown in FIG. 6, a second frame 114 for mounting the motor 70 is attached to the rear side of the first frame 112 which is located substantially in the center of the drawing. The shafts of the upper feed roller assembly 42 and the upper aligning roller assembly 44 are rotatably attached to one end portion or front end portion 116 of the first frame 112 and that end portion of the second frame 114 which faces the other end portion of the first frame 112 with the aid of bushings 118 and E-rings 120. The lower aligning roller assembly 45 is rotatably attached to the first and second frames 112 and 114 by means of bushings 122 and springs 124 so that it is urged upward. The lower aligning roller assembly 45 is pressed against the upper aligning roller assembly 44 for rotation. Interposed between the upper and lower aligning roller assemblies 44 and 45 is the guide plate 48 for guiding the upper surface of the swallowed original P. The guide plate 48 is supported by the first frame 112 and the shaft 78 of the upper aligning roller assembly 44.

Under the guide plate 48 lies the other guide plate 46 for guiding the lower surface of the original P to be transferred. The guide plate 46 is rockably supported on its supply side by the first and second frames 112 and 114 and a stay 126, and is urged to rock upward on its discharge side by springs 128 and 130. The lower feed roller assembly 43 is rotatably supported on the guide plate 46 so that it is pressed against the upper roller assembly 42 (see FIG. 2) for rotation by the urging force of the guide plate 46 in the rocking direction. The upper feed roller (slip roller) assembly 42 is formed of a white rubber material, while the lower feed roller assembly 43 is made of polyacetal, e.g., Delrin (trademark). The upper and lower aligning roller assemblies 44 and 45 are formed of rubber material and metal, respectively.

The actuator 38 for detecting the original and the inlet reed switch 40 are attached to that end portion of the first frame 112 on the side of the second frame 114 by means of supporting members 132 and 134, respectively. The motor 70 is mounted on the second frame 114 by means of a supporting plate 136. The gear unit 71 is arranged on the second frame 114. More specifically, the first and second gears 74 and 76 are mounted on one end portion of the shaft 72 of the motor 70, while the fourth gear 84 and the pulse disk 86 are mounted on one end portion of the shaft 82 of the feed roller assembly 42 with the aid of a bushing 135 and E-rings 137. Likewise, the third and fifth gears 80 and 90 are mounted on one end portion of the shaft 78 of the upper aligning roller assembly 44 with the aid of a bushing 135 and E-rings 137. The first frame 112 is rigidly screwed to a third frame 138 for supporting the transfer unit 30 with the aid of a first coupling frame 140 on the front side and a second coupling frame 142 on the rear side. Numeral 144 designates screws.

Figure 7:
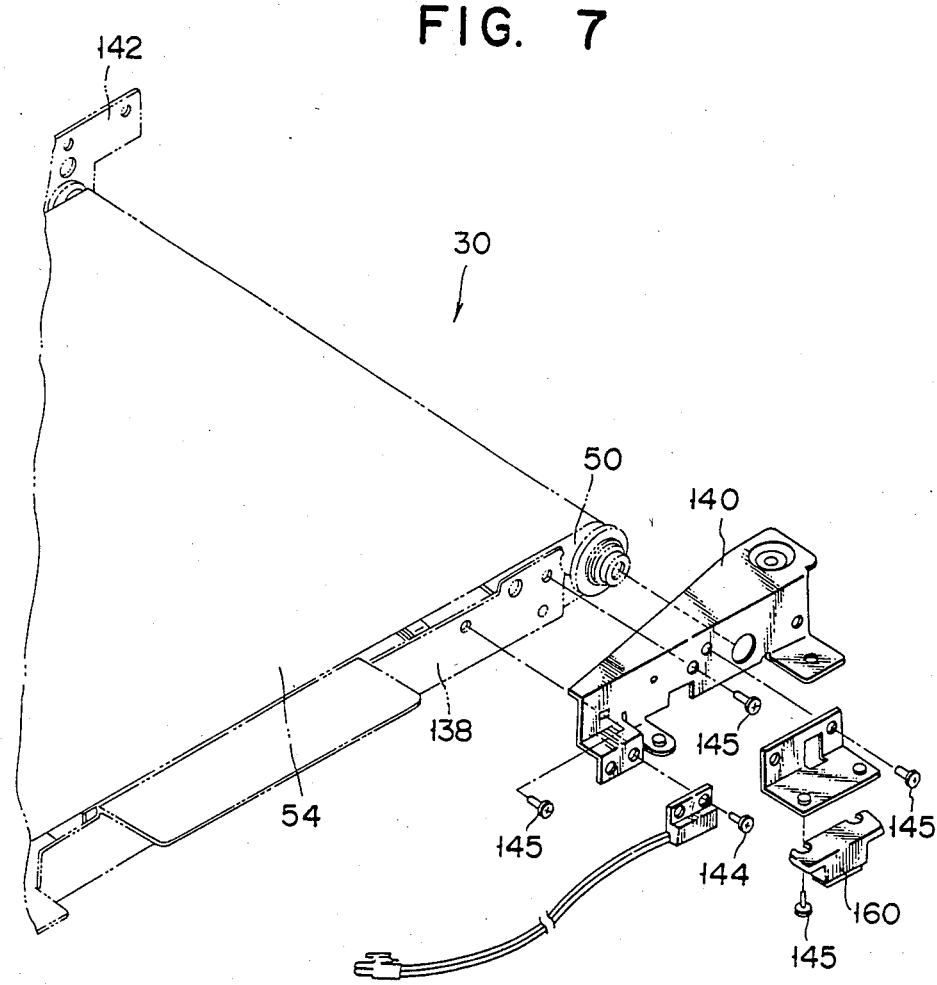
FIG. 7 is a perspective view showing part of a transfer unit of the original transfer apparatus of FIG. 2.

In the transfer unit 30, as shown in FIG. 7, the supply-side belt roller 50 is rotatably supported between the first and second coupling frames 140 and 142 on the rear and front sides of the third frame 138, respectively. When screws 145 on the first coupling frame 140 are removed, the inlet unit 28 and the transfer unit 30 are separated from each other, and the front side (right-hand side of FIG. 7) of the belt roller 50 is released so that the belt roller 50 can be disengaged from the transfer belt 54.

Figure 8:
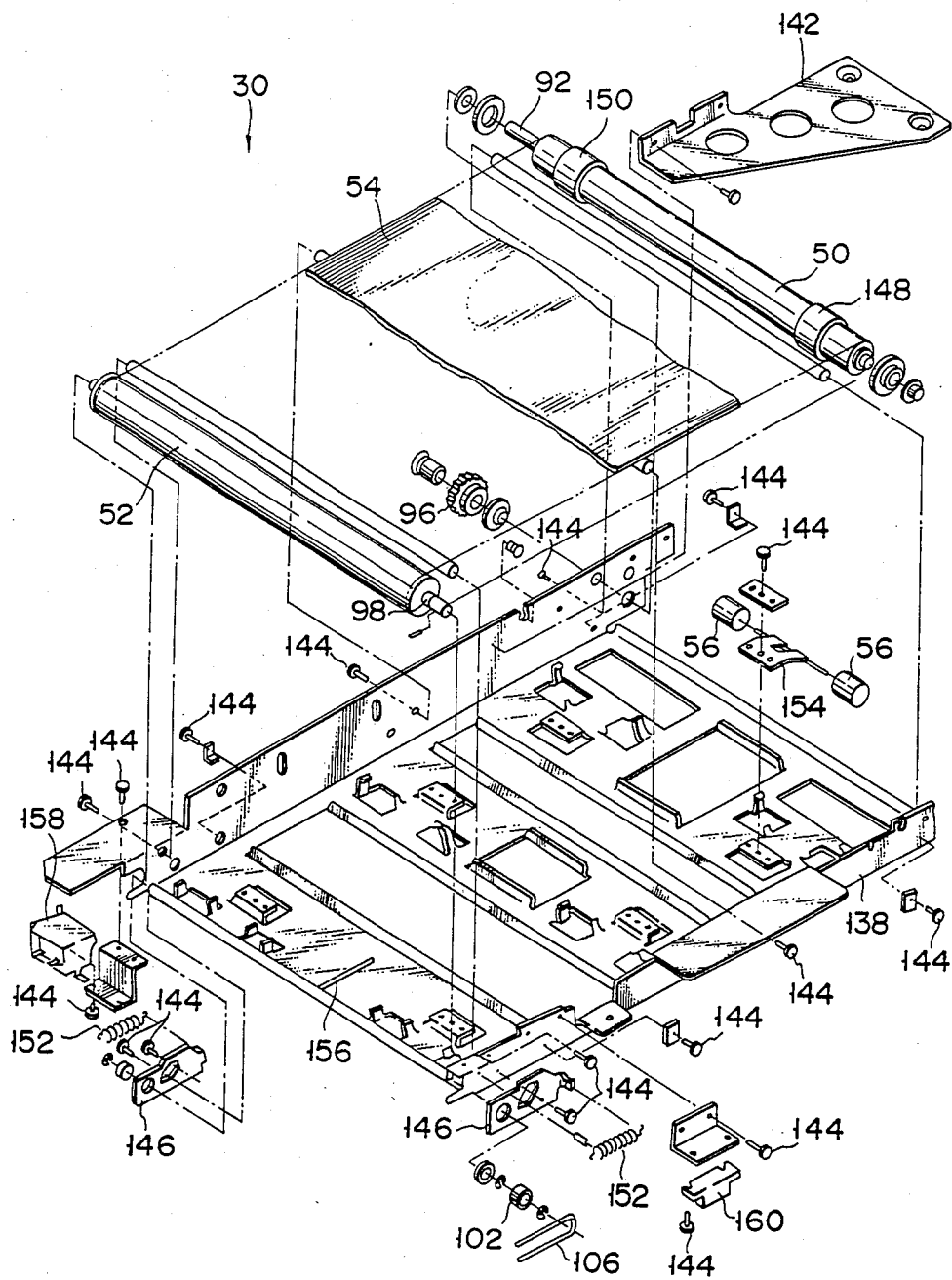
FIG. 8 is a disassembled perspective view showing the transfer unit of the original transfer apparatus of FIG. 2.

In the transfer unit 30, as shown in the general view of FIG. 8, both end portions of the discharge-side belt roller 52 are rotatably supported on both sides of the third frame 138, individually, by means of a pair of swinging frames 146 mentioned later. The transfer belt 54 is stretched in an endless manner between the discharge- and supply-side belt rollers 52 and 50. The supply-side belt roller 50 is formed of a rubber material and has a larger diameter 148 and 150 near each end. As mentioned before, the sixth gear 96 is mounted on the rear end of the shaft 92 of the belt roller 50. The discharge-side belt roller 52 is a smooth aluminum roller which can be elastically retreated upward by the two swinging frames 146 and springs 152 attached individually thereto. The pulley 102 is mounted on the front end of the shaft 98 of the belt roller 52, and the transmission belt 54 for transmitting the driving force to the exit roller assembly 68 (see FIG. 4) is passed around the pulley 102. The backup rollers 56, which are formed of polyacetal, e.g., Delrin (trademark), are attached to the third frame 138 by means of a leaf spring 154, whereby the transfer belt 54 is pressed against the original table 20. A presser portion 156 is formed in the center of the discharge-side end portion of the third frame 138 by extrusion, whereby the transfer belt 54 is guided pressed against the stopper 58 (see FIG. 2) so that no gap is allowed between the stopper 58 and the transfer belt 54. On the discharge side of the third frame 138, moreover, a solenoid 158 for driving the stopper 58 and a magnet catch 160 (see FIGS. 7 and 8) are attached to the rear and front sides, respectively. The magnet catch 160 and a magnet member 162 on the original table 20 of the copying machine 10 attract each other, thereby ensuring close contact between the original table 20 and the original transfer apparatus 12.

Figure 9:
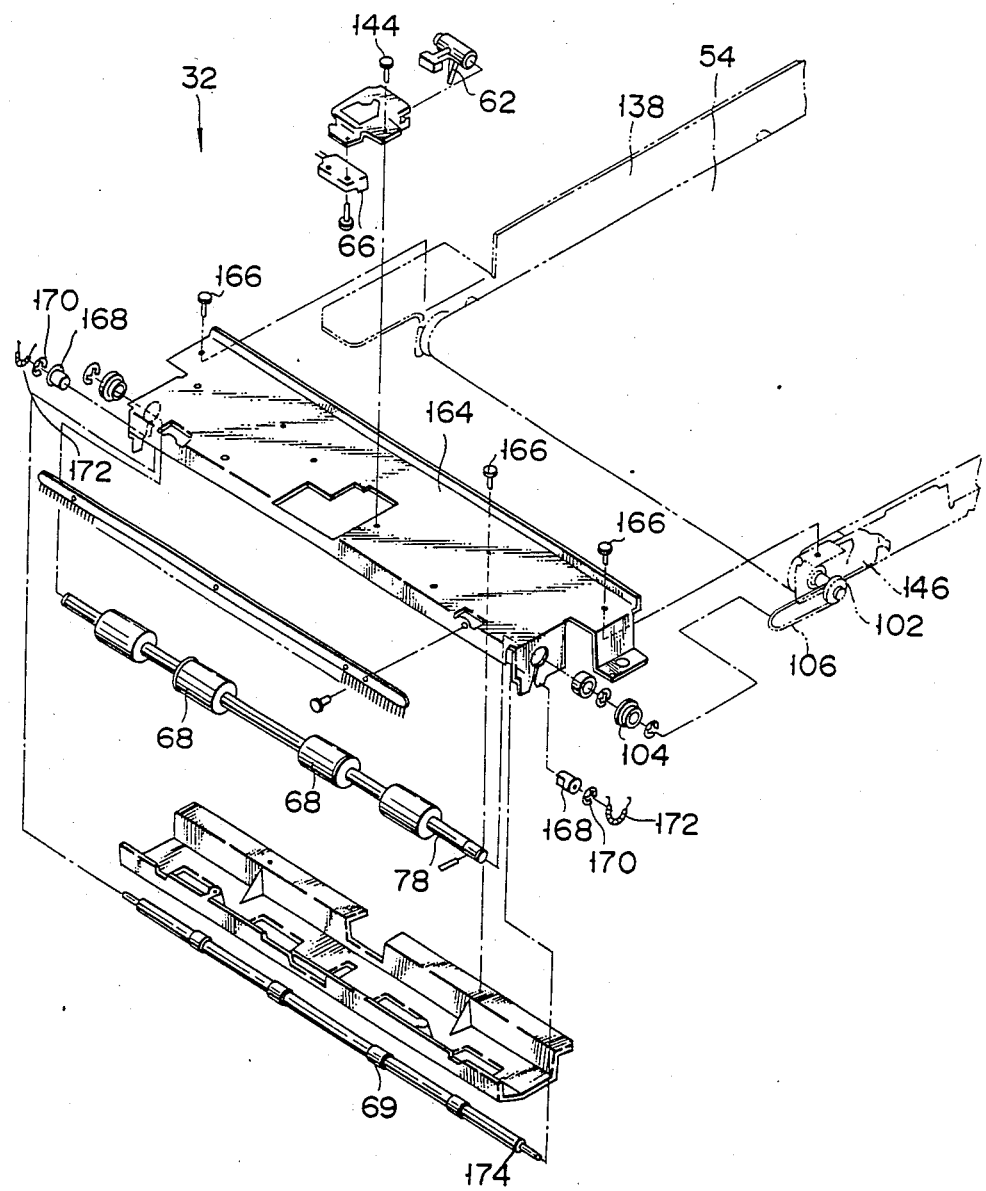
FIG. 9 is a disassembled perspective view showing an outlet unit of the original transfer apparatus of FIG. 2.

Referring now to FIG. 9, the outlet unit 32 will be described in detail. A fourth frame 164 is attached to the discharge-side portion of the third frame 138 of the transfer unit 30 by means of screws 166. The exit roller assemblies 68 and 69 (see FIG. 2) are rotatably supported on the front and rear sides of the fourth frame 164. The upper exit roller assembly 68 is formed of a rubber material. The pulley 104 is mounted on the front end of the shaft 78 of the exit roller assembly 68, and the transmission belt 106 is passed around the pulley 104. The lower exit roller assembly 69 is formed of metal and polyacetal, e.g., Delrin (trademark). Both front and rear end portions of the exit roller assembly 69 are rotatably mounted with the aid of bushings 168, E-rings 170, and springs 172 so as to be urged upward. With this arrangement, the lower exit roller assembly 69 is pressed against the upper exit roller assembly 68 when it rotates. Further, the fourth frame 164 is fitted with the actuator 62 to detect the discharge of the original, the outlet reed switch 66, and a paper guide 174 for guiding the upper surface of the original P. The transfer unit 30 and the outlet unit 32 can easily be separated from each other by removing the screws 166 from the third and fourth frames 138 and 164. Also, the transfer belt 54 can be disengaged from the belt roller 52 by removing the front-side swinging frame 146 (see FIG. 8) to release the front side of the belt roller 52.

Figure 10:
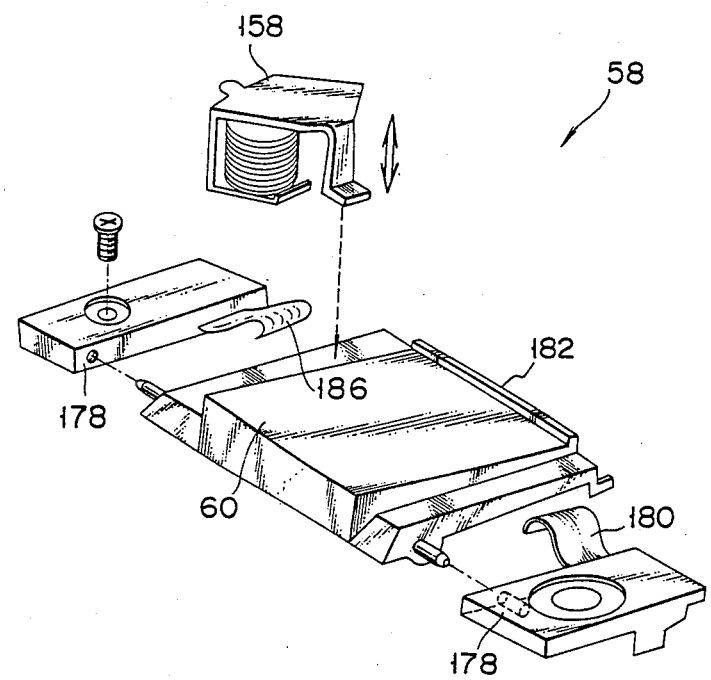
FIG. 10 is a disassembled perspective view of a stopper unit attached to the outlet unit shown in FIG. 9 and the image-forming apparatus.

In the stopper 58 (see FIG. 2), as shown in FIG. 10, the abutting member 60 for stopping the original P at the predetermined position on the original table 20 is attached to the left end (FIG. 2) of the original table 20. Namely, both front and rear sides of the abutting member 60 are rockably supported by hinges 178. A pair of leaf springs 180 is arranged under the abutting member 60 so as continually to push both sides of the abutting member 60 upward. The abutting member 60 has a stop portion 182 which projects above the top of the original table 20 to position the original P transferred thereto. The original transfer apparatus 12 is further provided with the solenoid 158 corresponding to the abutting member 60 in position. When the solenoid 158 is excited, the abutting member 60 is pressed down so that the stop portion 182 is located below the original table 20. Thus, the original P set on the original table 20 can be discharged through the gap between the original table 20 and the stop portion 182.

Figure 11:
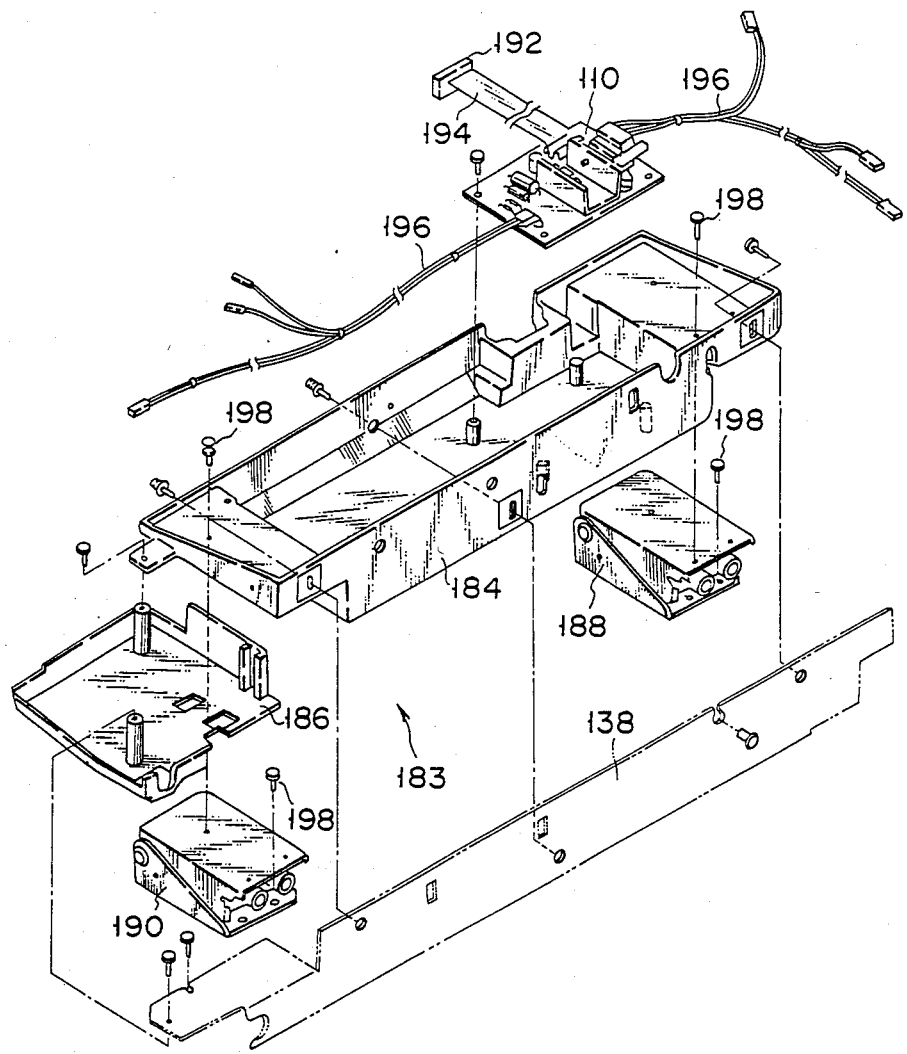
FIG. 11 is a disassembled perspective view of a rear unit of the original transfer apparatus shown in FIG. 3.
Figure 12:
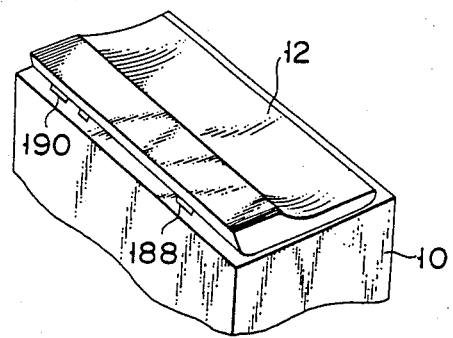
FIG. 12 is a perspective view schematically showing the back of the image-forming apparatus of FIG. 1.
Figure 13:
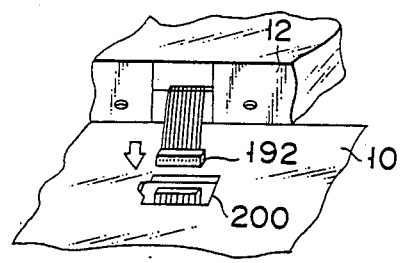
FIG. 13 is a diagram for illustrating the connection of the connector shown in FIG. 11.

Referring now to FIG. 11, there will be described a rear unit 185 whereby the original transfer apparatus 12 is swingably mounted on the copying machine 10 on the rear side. On the rear side of the third frame 138 of the transfer unit 30, first and second rear frames 184 and 186 are supported on the rear side of the top of the copying machine 10 by means of two hinges 188 and 190. The original transfer apparatus 12 is mounted so as to be swingable around the hinges 188 and 190. The first rear frame 184 is mounted with the printed board 110 (see FIG. 5) for controlling the drive of the motor 70. The printed board 110 is connected by means of a cord 194 with a connector 192 which can be connected to the copying machine 10 to be supplied thereby with electric power and logic signals. Cords 196 for controlling the drive of the motor 70 or the pulse detector 87 extend from the printed board 110. According to this arrangement, the original transfer apparatus 12 can easily be mounted on the copying machine 10 by securing the hinges 188 and 190 by means of screws 198 and then by connecting the connector 192 to its corresponding connecting portion 200 of the copying machine 10, as shown in FIG. 13.

Figure 14:
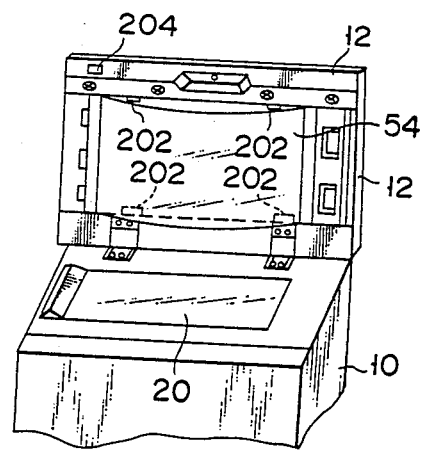
FIG. 14 is a perspective view showing an open position of the original transfer apparatus mounted on the image-forming apparatus of FIG. 1.

In the original transfer apparatus 12, as shown in FIG. 14, a pair of spacers 202 is arranged on each side of the transfer belt 54 along its course of transfer, whereby a suitable space is defined between the original table 20 and the original transfer apparatus 12 when the original apparatus 12 is swung down to close the top of the original table 20. Thus, the original P is transferred through the space provided by the spacers 202. In FIG. 14, numeral 204 designates a position switch for detecting the swing of the original transfer apparatus 12. The position switch 204 is turned on, for example, when the original transfer apparatus 12 is set on the original table 20.

Figure 15:
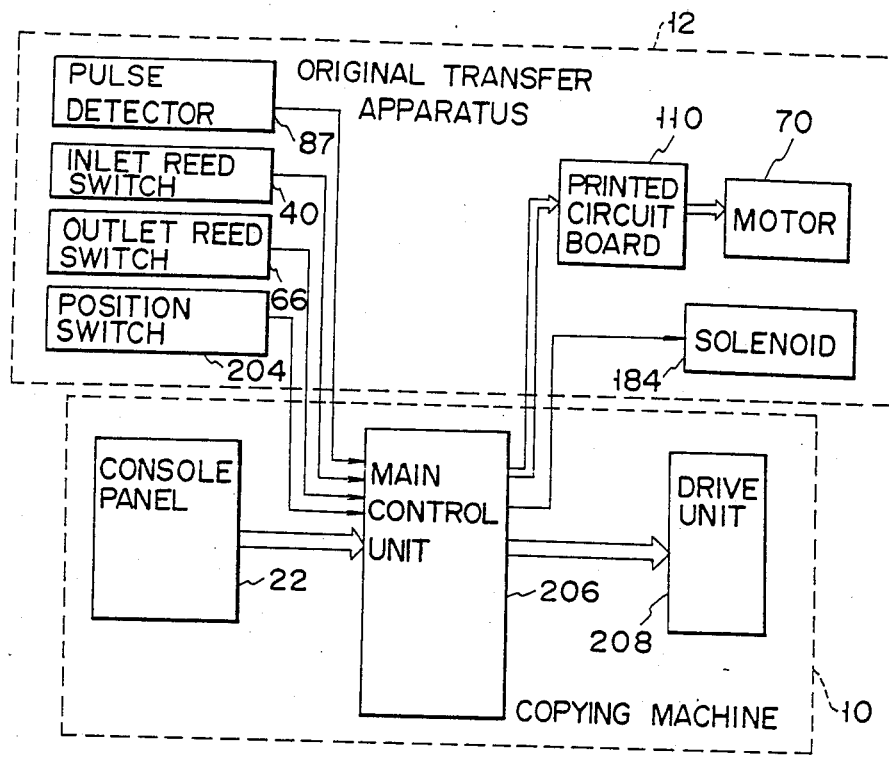
FIG. 15 is a block diagram of an image-forming apparatus mounted with the original transfer apparatus shown in FIG. 1.

Referring now to FIG. 15, a control mechanism for controlling the drive of the original transfer apparatus 12 will be described. The copying machine 10 is provided with a main control unit 206 for controlling the copying operation of the copying machine 10 and the drive of the original transfer apparatus 12. The main control unit 206 is connected to the console panel 22 and a drive unit 208 for copying the original P on the original table 20. The main control unit 206 is also connected, by means of the connector 192, to the pulse detector 87 of the original transfer apparatus 12, the inlet and outlet reed switches 40 and 66, the position switch 204, the printed board 110, and the stopper solenoid 158. Thus, the main control unit 206 controls the drive of all those elements.

Referring now to FIGS. 2 and 15, the operation of the original transfer apparatus 12 will be described. In FIG. 2, when the original P is led onto the original guide plate 46 and is pressed against the feed roller assemblies 42 and 43, the detecting mechanism 34 consisting of the inlet reed switch 40 and the actuator 38 detects the original P. A detection signal from the detecting mechanism 34 is delivered to the main control unit 206 of the copying machine 10. On receiving the detection signal, the main control unit 206 starts the preliminary operation which starts the copying operation on the copying machine 10. After the passage of a predetermined time, the main control unit 206 sends a reverse signal for the reverse rotation of the motor 70 to the printed board 110 of the original transfer apparatus 12, thereby causing the motor 70 to rotate in the reverse direction. As the motor 70 rotates in reverse, only the feed roller assemblies 42 and 43 are allowed to rotate, and the original P is transferred until it abuts against the aligning roller assemblies 44 and 45 for alignment. Since the force of the lower feed roller assembly 43 to press the upper feed roller assembly 42 is small, the upper feed roller assembly 42 slips on the original P to produce friction. In spite of this, the upper feed roller assembly 12 will never soil the original P because it is made of a white rubber material. This effect may be increased if the lower feed roller assembly 43 is also formed from white rubber.

When it is detected by the pulse detector 87 that the rotation of the motor 70 has reached a predetermined number of revolutions, the main control unit 206 of the copying machine 10 stops the reverse rotation of the motor 70 and delivers a signal to the printed board 110 for the forward rotation of the motor 70 after a predetermined time. As a result, the motor 70 is shifted from the reverse mode to the forward mode, and the aligning roller assemblies 44 and 45, the transfer belt 54, and the exit roller assemblies 68 and 69 rotate. Then, the original P is carried onto the original table 20 by the aligning roller assemblies 44 and 45 and the transfer belt 54, and is stopped when its forward end is pressed against the stop portion 182 (see FIG. 10) of the stopper 60. When the rotation of the motor 70 reaches a predetermined number of revolutions, the main control unit 206 delivers a stop signal to the printed board 110, thereby stopping the motor 70. Thus, the setting of the original P is accomplished. The transfer belt 54 may be replaced with, for example, a roller formed of soft white sponge.

In this embodiment, the transfer belt 54 is formed by coating a polyester core with polyurethane to whiten the surface and graining the outer surface for higher friction. Thus, the conveying force of the transfer belt 54 is derived from the weight of the belt 54 and the elasticity of the leaf spring 154 (see FIG. 8) for pressing the backup rollers 56 inside the belt 54. The force of the backup rollers 56 to press the transfer belt 54 is, e.g., about 100 g in total. The backup rollers 56 press the original P through the transfer belt 54, and force part of the belt 54 to undulate for a stable transfer. The supply-side belt roller 50 has large-diameter portions 148 and 150 which are substantially symmetrical with respect to the center of the roller 50. While the outside diameter of the regular portion of the supply-side belt roller 50 is, e.g., 25 mm, that of the larger diameter portions 148 and 150 is 25.6 mm. Thus, the larger diameter portions 148 and 150 produce swellings on both edges of the transfer belt 54, so that both sides of the original P are positively pressed for a greater conveying force. In this case, the components of the force which convey the original P are distributed more densely in the edges than in the central portion, so that the original P can be transferred smoothly.

When the setting of the original P is accomplished, the drive unit 208 starts copying. Upon completion of the copying operation, the original P is discharged in the following manner. The solenoid 158 is driven to cause the abutting member 60 of the stopper 58 to retreat from the original table 20, thereby allowing the original P to be transferred. After a predetermined time, the motor 70 starts a forward rotation which drives the transfer belt 54. As a result, the original P is moved beyond the abutting member 60, and then discharged into the original receiving tray 26 by the exit roller assemblies 68 and 69. When the forward rotation of the motor 70 reaches a predetermined number of revolutions, the solenoid 184 is turned off, causing the abutting member 60 of the stopper 58 to return to its original position. At the same time, the motor 70 is stopped, and the discharge of the original P is accomplished. The outlet switch 66, which is intended to detect jams, checks the original P for the presence of a jam with a predetermined timing.

In the original transfer apparatus 12 described above, all the components including the motor 70 are contained in the apparatus housing. In attachment, therefore, the original transfer apparatus 12 can be electrically connected to the copying machine 10 through a single connector 192 (see FIG. 13) only, obviating the necessity of additional electrical components. Thus, according to this embodiment, the original transfer apparatus 12 may easily be added as an option to the copying machine 10 or replaced.

Since only the single motor 70 is used for driving all of the moving parts including the feed roller assemblies 42 and 43, the aligning roller assemblies 44 and 45, the transfer belt 54, and the exit roller assemblies 68 and 69, the original transfer apparatus is light in weight and easy to handle.

If the transfer belt 54 is soiled or damaged, it will require replacement. According to this embodiment, the inlet unit 28, the transfer unit 30, and the outlet unit 32 are coupled by means of screws and the coupling frames 140 and 142. Therefore, the transfer belt 54 may easily be detached from the original transfer apparatus by removing the screws and the coupling frames 140 and 142 to separate the units from one another and to release the belt roller assemblies 50 and 52.

It is to be understood that the present invention is not limited to the embodiment described above, and that various changes and modifications may be effected therein by one skilled in the art without departing from the scope or spirit of the invention.

For example, in the embodiment described above, a single motor is provided as the drive source in the apparatus housing. Alternatively, however, a plurality of motors may be arranged in the housing. In this case, the gear unit of the transfer mechanism may be simplified in construction.

Although the power source for driving the motor and the main control unit for feeding indication signals to the printed board for motor control, according to the above embodiment, are provided in the image forming apparatus, they may also be arranged in the original transfer apparatus.

In the above embodiment, moreover, the housing of the original transfer apparatus is mounted by means of the hinges so that it can swing relative to the original table. Alternatively, however, the housing may be designed so that it cannot swing against the original table.

What is claimed is:

1. An original transfer apparatus used in an image-forming apparatus for forming an image in accordance with image information from an original set on an original table, whereby the original is transferred to the original table, comprising:
   a housing attached to the image-forming apparatus, said housing being provided with a hinge for supporting the housing so that the housing can swing relative to the original table when the housing is attached to the image-forming apparatus;
   a transfer mechanism disposed in the housing, said transfer mechanism including an inlet unit for swallowing the original, a transfer unit for transferring th original swallowed by the inlet unit to the original table, and an outlet unit for discharging the original on the original table therefrom; and
   a drive source integrally provided in the housing and adapted to drive the transfer mechanism.

2. An apparatus according to claim 1, wherein said drive source includes a motor.

3. An apparatus according to claim 2, wherein said image-forming apparatus is provided with a power source for driving the motor, and said motor is provided with a connector adapted to be connected to the power source when the housing is attached to the image-forming apparatus.

4. An apparatus according to claim 1, wherein said drive source reversibly rotates, and said transfer mechanism further includes a gear unit coupled to the inlet unit, the transfer unit, and the outlet unit, said units being driven by said drive source coupled to the gear unit.

5. An apparatus according to claim 1, wherein said transfer unit includes a transfer belt for holding in cooperation with the original table the original to be transferred.

6. An apparatus according to claim 1, wherein said inlet unit includes a detecting mechanism for detecting the swallowed original, and said housing is provided with a printed board for controlling the drive of the drive source in accordance with a detection signal from the detecting mechanism, whereby the inlet unit, the transfer unit, and the outlet unit control the drive.

7. An apparatus according to claim 1, wherein said outlet unit includes a stopper for stopping the original transferred thereto by the transfer unit at a predetermined position on the original table, said stopper being adapted to be released when discharging the original.

8. An apparatus according to claim 7, wherein said stopper includes an abutting member capable of projecting to the housing side from the original table to engage the forward end of the original, and the housing includes a drive means for projecting the abutting member into the path of transfer of the original.

9. An apparatus according to claim 1, wherein said outlet unit includes a detecting mechanism for detecting the discharge of the original.

10. An apparatus according to claim 4, wherein said gear unit includes a detector for counting revolutions of the drive source and delivering a detection signal, said detector being connected to the printed board so that the drive source is controlled in accordance with the number of revolutions of the drive source.

* * * * *